(12) United States Patent
Martinson et al.

(10) Patent No.: US 7,833,647 B2
(45) Date of Patent: Nov. 16, 2010

(54) CLOSURE VENT SEAL AND ASSEMBLY

(75) Inventors: Jeannine L. Martinson, Bay Village, OH (US); Richard A. Langan, Parma, OH (US); James X. Wu, North Olmsted, OH (US)

(73) Assignee: Eveready Battery Company, Inc., St, Louis, MO (US)

( * ) Notice: Subject to any disclaimer, the term of this patent is extended or adjusted under 35 U.S.C. 154(b) by 1196 days.

(21) Appl. No.: 11/449,113

(22) Filed: Jun. 8, 2006

(65) Prior Publication Data

US 2006/0228620 A1  Oct. 12, 2006

Related U.S. Application Data

(63) Continuation-in-part of application No. 10/833,549, filed on Apr. 28, 2004, now Pat. No. 7,687,189.

(51) Int. Cl.
H01M 2/12 (2006.01)

(52) U.S. Cl. ........................................... 429/56

(58) Field of Classification Search ............. 429/53–60, 429/66, 163–164, 174, 178, 181, 185
See application file for complete search history.

(56) References Cited

U.S. PATENT DOCUMENTS

| | | | |
|---|---|---|---|
| 3,279,953 A | 10/1966 | Bierdumphel | |
| 3,852,117 A | 12/1974 | Fraioli | |
| 4,345,611 A | 8/1982 | Ikeda et al. | |
| 4,783,383 A | 11/1988 | Machida et al. | |
| 4,855,195 A | 8/1989 | Georgopoulos et al. | |
| 4,963,446 A | 10/1990 | Roels et al. | |
| 5,015,542 A | 5/1991 | Chaney, Jr. et al. | |
| 5,043,235 A | 8/1991 | Seefeldt et al. | |
| 5,156,930 A * | 10/1992 | Daio et al. | 429/53 |
| 5,418,084 A | 5/1995 | Georgopoulos | |
| 5,462,820 A | 10/1995 | Tanaka | |
| 5,532,075 A | 7/1996 | Alexandres et al. | |
| 5,609,972 A | 3/1997 | Kaschmitter et al. | |
| 5,677,076 A | 10/1997 | Sato et al. | |
| 5,691,073 A * | 11/1997 | Vu et al. | 429/7 |
| 5,741,606 A | 4/1998 | Mayer et al. | |
| 5,747,187 A | 5/1998 | Byon | |

(Continued)

FOREIGN PATENT DOCUMENTS

EP  391720 A  10/1990

(Continued)

OTHER PUBLICATIONS

Patent Cooperation Treaty (PCT), International Search Report and Written Opinion for Application PCT/US2007/013276, filed Jun. 6, 2007, mailed Nov. 30, 2007, 14 pgs., European Patent Office, Netherlands.

*Primary Examiner*—Patrick Ryan
*Assistant Examiner*—Muhammad Siddiquee
(74) *Attorney, Agent, or Firm*—Robert C. Baraona (57) ABSTRACT

A closure assembly and rupturable vent seal adapted for use in an electrochemical battery cell is disclosed. The vent seal includes a series of peripheral projections that can be folded to insure proper sealing of the vent without wrinkles or overlapping folded portions. Methods of accomplishing the invention are also contemplated.

13 Claims, 5 Drawing Sheets

U.S. PATENT DOCUMENTS

| | | | |
|---|---|---|---|
| 5,766,790 | A | 6/1998 | Kameishi et al. |
| 5,876,868 | A | 3/1999 | Tanida |
| 6,207,320 | B1 | 3/2001 | Song et al. |
| 6,265,097 | B1 | 7/2001 | Konno et al. |
| 6,444,348 | B1 | 9/2002 | Saijo et al. |
| 6,451,473 | B1 | 9/2002 | Saito et al. |
| 6,468,692 | B1 | 10/2002 | Nemoto et al. |
| 6,497,978 | B1 | 12/2002 | Takada et al. |
| 6,531,242 | B1 | 3/2003 | Sugimoto et al. |
| 6,610,437 | B2 | 8/2003 | Tsurutani et al. |
| 6,610,438 | B2 | 8/2003 | Okumura et al. |
| 6,620,544 | B1 | 9/2003 | Shin et al. |
| 6,777,128 | B2 | 8/2004 | Kim |
| 6,844,110 | B2 | 1/2005 | Enomoto et al. |
| 7,335,439 | B2 | 2/2008 | Kawano et al. |
| 7,368,203 | B2 | 5/2008 | Iwanaga et al. |
| 2003/0087146 | A1 | 5/2003 | Chi |
| 2003/0118902 | A1 | 6/2003 | Schubert et al. |
| 2004/0121229 | A1 | 6/2004 | Kim et al. |
| 2004/0131940 | A1 | 7/2004 | Suzuki et al. |
| 2004/0241541 | A1 | 12/2004 | Watanabe et al. |
| 2005/0079404 | A1 | 4/2005 | Schubert et al. |
| 2005/0084752 | A1 | 4/2005 | Kim |
| 2005/0244706 | A1 | 11/2005 | Wu et al. |
| 2006/0115725 | A1 | 6/2006 | Kim |
| 2006/0222941 | A1 | 10/2006 | Yamashita et al. |
| 2007/0015046 | A1 | 1/2007 | Kim et al. |
| 2007/0141449 | A1 | 6/2007 | Kim |
| 2007/0154781 | A1 | 7/2007 | Choi |
| 2007/0202364 | A1 | 8/2007 | Uh et al. |

FOREIGN PATENT DOCUMENTS

| | | | |
|---|---|---|---|
| EP | 415378 | A | 3/1991 |
| JP | 60148049 | A | 8/1985 |
| JP | 1994231743 | A | 8/1994 |
| JP | 07094161 | A | 4/1995 |
| JP | 1996077995 | A | 3/1996 |
| JP | 08138727 | A | 5/1996 |
| JP | 1997161753 | A | 6/1997 |
| JP | 09213289 | A | 8/1997 |
| JP | 09274900 | A | 10/1997 |
| JP | 10112300 | A | 4/1998 |
| JP | 10223183 | A | 8/1998 |
| JP | 10241645 | A | 9/1998 |
| JP | 10275604 | A | 10/1998 |
| JP | 10340714 | A | 12/1998 |
| JP | 1999086819 | A | 3/1999 |
| JP | 11102676 | A | 4/1999 |
| JP | 1999111255 | A | 4/1999 |
| JP | 1999224658 | A | 8/1999 |
| JP | 11260334 | A | 9/1999 |
| JP | 11283588 | A | 10/1999 |
| JP | 2000077078 | A | 3/2000 |
| JP | 2000260409 | A | 9/2000 |
| JP | 2000277063 | A | 10/2000 |
| JP | 2000277067 | A | 10/2000 |
| JP | 2001266805 | A | 9/2001 |
| JP | 2001332231 | A | 11/2001 |
| JP | 2001351609 | A | 12/2001 |
| JP | 2002008601 | A | 1/2002 |
| JP | 2003303623 | A | 10/2003 |
| JP | 2003324523 | A | 11/2003 |
| JP | 2005071649 | A | 3/2005 |
| JP | 2005093186 | A | 4/2005 |
| JP | 2005123017 | A | 5/2005 |
| JP | 2005259413 | A | 9/2005 |
| JP | 2006216358 | A | 8/2006 |
| JP | 2006221988 | A | 8/2006 |
| JP | 2006252848 | A | 9/2006 |
| JP | 2006278267 | A | 10/2006 |
| JP | 2006286561 | A | 10/2006 |
| JP | 2007027103 | A | 2/2007 |
| JP | 2007141673 | A | 6/2007 |
| JP | 2007157609 | A | 6/2007 |
| JP | 2007194065 | A | 8/2007 |
| JP | 2007207614 | A | 8/2007 |
| KR | 20010061300 | A | 7/2001 |
| KR | 20060010941 | A | 2/2006 |

\* cited by examiner

CLOSURE VENT SEAL AND ASSEMBLY

RELATED APPLICATIONS

This application is a continuation-in-part of U.S. Ser. No. 10/833,549, originally filed on Apr. 28, 2004 now U.S. Pat. No. 7,687,189.

BACKGROUND

The present invention relates to closure assemblies for electrochemical cells and particularly to a rupturable vent seal and apparatus adapted for use in non-aqueous electrochemical cells.

Batteries used as power sources for electronic equipment need to store large amounts of energy. Such batteries may contain one or more electrochemical cells. Pressure inside each cell may increase due to changes in internal temperature, an increase in internal volume of electrodes during discharge and/or gases generated during cell charging (in the case of secondary batteries) and/or discharge of the cell. Thus, batteries typically include a mechanism for releasing or discharging gas away from the cell to limit the buildup of internal pressure.

Some electrochemical battery cell designs have an open-ended container and a collector assembly disposed at the open end of the container to close the electrochemical battery cell. In such cases, the collector assembly (also sometimes referred to as a header assembly) usually includes a safety pressure release vent mechanism that releases excessive pressure.

Primary and secondary electrochemical cells having non-aqueous electrolytes, such as cells with electrodes containing lithium metal and lithium intercalation materials, typically have collector assemblies with thin-walled plastic sealing members to minimize vapor transmission and pressure relief vents that are able to very quickly reduce internal pressure. While issues associated with the caustic aqueous electrolyte solutions are relatively well documented, the variety, volatility and reactivity of the various non-aqueous electrolytes and salts required by the specific chemistries used in such cells pose a unique set of challenges for cell designers, in terms of materials, design specifications and the like.

Various collector assembly and pressure release vent designs have been used in electrochemical cells. For example, resealable pressure relief vents can be found in rechargeable aqueous electrolyte cells, such as nickel-cadmium and nickel-metal hydride cells. Primary (nonrechargeable) aqueous cells, such as alkaline zinc-manganese dioxide cells, have used collector assemblies with relatively large surface area plastic seals containing a weak section that can rupture when the internal pressure exceeds a predetermined limit.

Figure 1:
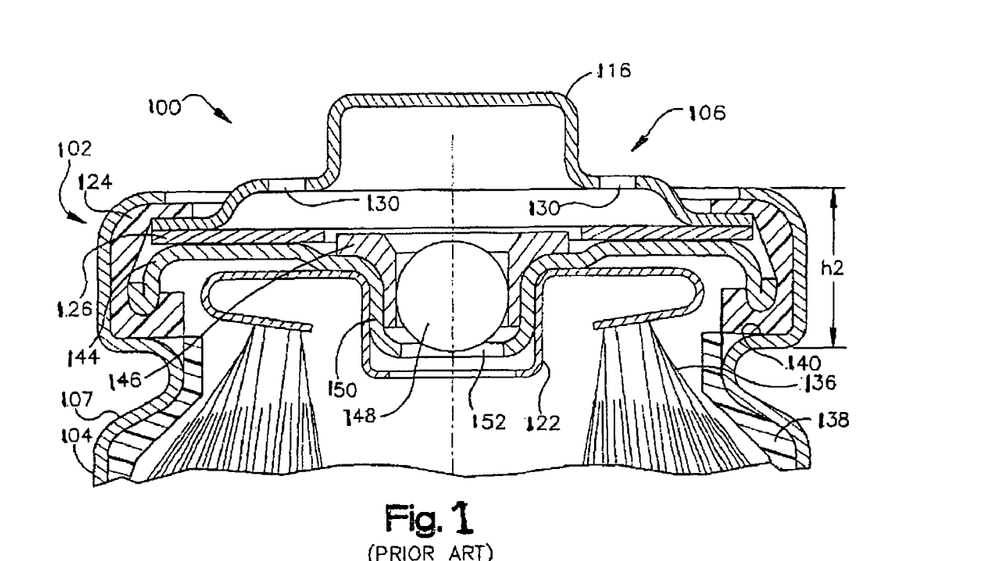
FIG. 1 is a cross-sectional view of the top portion of an electrochemical battery cell and collector assembly of the prior art.

FIG. 1 shows a cross-sectional view of the top portion of a typical electrochemical battery cell 100 of the prior art. The electrochemical battery cell 100 includes a housing 102 that includes a container 104 having a bead 107 that separates the top and bottom portions of the container 104, and an open end that is closed by collector assembly 106. Collector assembly 106 acts as a closure mechanism for the open end of container 104 and includes a positive contact terminal 116 having one or more vent holes 130, a gasket 124, a positive temperature coefficient (PTC) device 126, a cell cover 144, a bushing 146, a vent ball 148, and a contact spring 122 that is in physical contact with the current collector 136 which extends from the electrode assembly (not shown) in the bottom portion of container 104. The current collector 136 is otherwise physically separated from the container 104 by an insulator 138.

The cell cover 144 has a vent well 150 that projects downward away from the positive contact terminal 116 internal to the electrochemical battery cell 100. The vent well 150 has a vent aperture 152 formed therein which is sealed by the vent ball 148 and vent bushing 146 when they are seated in the vent well 150 such that the bushing 146 is compressed between the vent ball 148 and the vertical wall of the vent well 150. When the internal pressure of the electrochemical battery cell 100 exceeds a predetermined level, the vent ball 148, and in some cases both the bushing 146 and the vent ball 148, are forced away from the vent aperture 152 and at least partly out of the vent well 150 to release pressurized gas through the vent aperture 152 and vent holes 130 of electrochemical battery cell 100.

Other examples of conventional collector assembly and pressure release vent designs can be found in: U.S. Pat. No. 4,963,446 (issued to Roels et al. Oct. 16, 1990), U.S. Pat. No. 5,015,542 (issued to Chaney, Jr. et al. May 14, 1991), U.S. Pat. No. 5,156,930 (issued to Daio et al. Oct. 20, 1992), U.S. Pat. No. 5,609,972 (issued to Kaschmitter et al. May 11, 1997), U.S. Pat. No. 5,677,076 (issued to Sato et al. Oct. 14, 1997), U.S. Pat. No. 5,741,606 (issued to Mayer et al. Apr. 21, 1998) and U.S. Pat. No. 5,766,790 (issued to Kameishi et al. Jun. 16, 1998). Each of these examples has a large collector assembly volume or dimensional constraints limiting the internal volume within the cell for active ingredients or a large number of components making the cell more costly and difficult to manufacture. In fact, most collector and closure assemblies in the art require a substantial amount of space, in relation to the height of the cell (and mores specifically, in cylindrical cells, in relation to the axial height), thereby reducing the overall amount of electrochemically reactive materials that may be enclosed within the cell. Additionally, reliance upon multiple and/or relatively large-sized gaskets may further limit the ability of a cell to retain its electrolyte because of the vapor-transmissive properties of the gasket material.

Because the vast majority of commercially available primary cells must have containers sized to standardized dimensions (e.g., a "AA" size or, according to ANSI nomenclature, a R6 size container), the ability to volumetrically maximize electrochemically reactive materials within a cell is of the utmost importance, particularly with respect to many of the smaller standardized sizes (e.g., "AAA" size or, according to ANSI nomenclature, a R3 size container). Moreover, volumetric issues are of particular concern in electrochemical systems incorporating a lithium electrode, because many lithium-based systems (and especially those adapted to a 1.5V platform) tend to expand during discharge.

Notwithstanding the desire to maximize volumetric capacity by reducing the volume of the closure assembly—particularly with respect to its profile (i.e., the amount of axial height it requires in a cylindrical cell), cell closure systems must still provide a long-lasting seal that is impervious to corrosion and that reliably prevents leakage and/or vapor transmission of any volatile electrolytes or other fluids contained within the cell both prior and subsequent to discharge. Weight loss concerns are even more significant in smaller standard cell sizes (e.g., R3 and/or "AAAA" size or, according to the ANSI nomenclature, R61 size cells, in particular) because the potential volume and weight of the overall cell decreases more significantly than the surface area through which vapor may be transmitted (i.e., the header assembly) as the volume capacity decreases in standard cell sizes.

Cell closure systems must also allow for emergency venting of volatile fluids during discharge so as to prevent catastrophic failures of the cell. Absent a vent mechanism, the cell may bulge, leak or disassemble during discharge.

SUMMARY OF INVENTION

One object of the invention is to provide a cell closure assembly that optimizes volumetric capacity of the cell without surrendering any of the longevity or safety afforded by previously known systems. A further object of the invention is to provide a vent seal that can be incorporated with standardized cell sizes that simplifies manufacturing procedures by eliminating parts or reducing manufacturing steps, particularly with respect to certain laminate foils and/or heat activated sealing materials/processes. The invention is expected to have particular applicability for electrochemical cell systems capable of operating over a wide temperature range, especially with respect to non-aqueous cells and particularly primary non-aqueous cells such as lithium-iron disulfide based systems. However, it should be noted that the aforementioned objects are merely exemplary, and those skilled in the art will readily appreciate the numerous advantages and alternatives that can be incorporated according to the following description of embodiments and all the various derivatives and equivalents thereof, all of which are expressly contemplated as part of this disclosure.

In a first embodiment, a vent closure seal for an electrochemical cell container is provided. The closure includes a planar member which is formed in a manner that allows it to serve as a rupturable seal for the cell. The member also has one or more protruding portions formed along its periphery, where the protrusions extend radially beyond the non-protruding portions along that periphery.

In another embodiment, a method for making and sealing an electrochemical cell is contemplated. Here, a rupturable vent member with protruding peripheral portions, inner header ring and cell container are provided. A cell closure is then formed by crimping the protruding portions of the vent member along the inner header ring without wrinkling the vent member and then the cell closure is coupled and sealed to a cell container to create an electrical contact between the container and one of the cell electrodes, thereby forming an electrochemical cell.

Still another embodiment involves a method for making and sealing an electrochemical cell where a header assembly (preferably having two pieces) and a rupturable vent which has the same shape as the header assembly, excepting for a number of protruding portions which extend radially beyond the outer periphery of the vent/header assembly, are provided. Here again, the protruding portions are crimped around or between the header assembly to form a cell closure so that none of the protruding portions overlap after being crimped, and the closure is then used to seal the components of an electrochemical cell (e.g., anode, cathode, electrolyte) within the cell container.

A further embodiment calls for a vent closure seal assembly for an electrochemical cell container having a closure cup, an electrical contact mechanism having a defined peripheral shape and a rupturable vent with a peripheral shape differing from that of the closure cup. Notably, the vent is fixed between the closure cup and the electrical contact mechanism, and the diameter of the peripheral shape of the vent must be equal to or, in at least one instance, greater than the corresponding diameter of the electrical contact mechanism along a given planar axis which intersects a common center point of the electrical contact mechanism.

Yet another embodiment contemplates a vent closure seal for an electrochemical cell container which includes a circular disc constructed from a material that will selectively rupture upon exposure to a predetermined pressure of electrochemical reaction gases. The disc also has at least one projection integrated along the circumference and extending radially outward from the circular disc.

BRIEF DESCRIPTION OF DRAWINGS

The invention can be understood with reference to the following drawings. The components in the drawings are not necessarily to scale. Also, in the drawings, like reference numerals designate corresponding parts throughout the several views. In particular.

DETAILED DESCRIPTION

Figure 2:
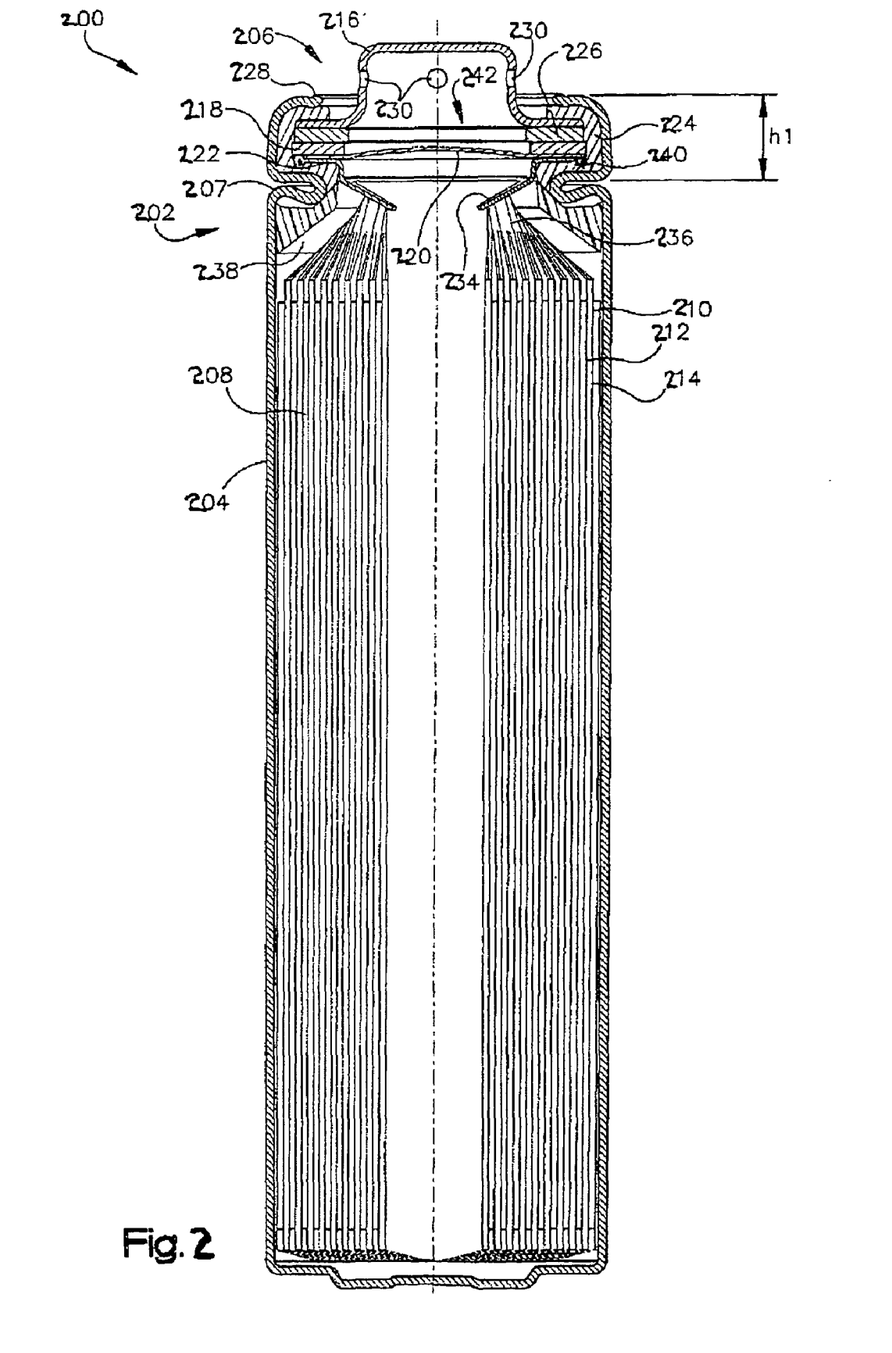
FIG. 2 is a cross-sectional view of an electrochemical battery cell according to one embodiment of the invention.

FIG. 2 shows a cylindrical electrochemical battery cell 200 according to an embodiment of the present invention. Electrochemical battery cell 200 of the present invention has a housing 202 that includes a container 204 and a collector assembly 206. The container 204 has a closed bottom and an open top end that is closed by the collector assembly 206. The container 204 also has a bead 207 that separates the top and bottom portions of the container 204. Disposed within the bottom portion of the container 204 is an electrode assembly 208 that includes a negative electrode or anode 210, a positive electrode or cathode 212, and a separator 214 disposed between the anode 210 and the cathode 212. In the example embodiment shown in FIG. 2, the anode 210, cathode 212 and separator 214 are each thin sheets which are wound together in a spiral, also known as a "jelly roll" design. Electrochemical battery cell 200 is cylindrical, however, one skilled in the art can appreciate that alternative embodiments of the present invention can also include cells and electrodes of other shapes. The container 204 can be one of several geometric shapes for open-ended containers (for example, prismatic and rectangular), provided that the teachings regarding the shape of the vent member relative to the open end of these containers are followed. Nevertheless, insofar as sealing of an open-ended cylindrical cell presents unique challenges regarding the radial and axial forces required to create that seal, collector assembly 206 which incorporates vent member 220 is expected to have particular applicability to cylindrical containers.

If electrochemical battery cell is a lithium electrochemical battery cell, the anode 210 contains lithium metal or alloyed lithium metal, which can be in the form of a sheet or foil. A cathode 212 for a lithium cell can contain one or more active materials, usually in particulate form. Any suitable active cathode material may be used, and can include, for example, $FeS_2$, $MnO_2$, $CF_x$, and $(CF)_n$. Suitable separator materials are electrically non-conductive but are ion-permeable to electrolyte. Electrolytes that are used in a lithium electrochemical battery cell typically comprise organic solvents, which tend to be more corrosive and incompatible with many materials commonly used in alkaline or aqueous cells, as well as corresponding salts and/or co-solvents. Further details regarding the material compositions used for the anode 210, cathode 212, separator 214 and electrolyte of lithium as well as various other electrochemical battery cells are described below, although additional information can also be found in U.S. Pat. Nos. 5,290,414; 5,514,491; and 6,849,360, all of which are incorporated by reference herein.

The container 204 can be a metal can with an integral closed bottom, however, a metal tube that is initially open at both ends may also be used. The cell container 204 can be a steel that is optionally plated, for example, with nickel, on at least the outside to protect the outside of the container 204 from corrosion or to provide a desired appearance. Also, the type of steel can depend in part on the manner in which the container 204 is formed. For example, containers which are made using a drawing process can be made of a diffusion annealed, low carbon, aluminum killed, SAE 2006 or equivalent steel, with a grain size of ASTM 9 to 11 and equiaxed to slightly elongated grain shape. Other metals may be used to meet particular needs. For example, for an electrochemical battery cell 200 in which the container 204 is in electrical contact with the cathode 212, the open circuit voltage of the cell is about 3 volts or more, or the cell is rechargeable, a more corrosion-resistant container material than steel may be desired. Such materials include but are not limited to stainless steels, nickel plated stainless steels, nickel clad or nickel plated stainless steels, aluminum and alloys thereof.

The collector assembly 206 which is disposed in the top portion of the housing 202 can include a positive contact terminal 216, a retainer 218 which defines an opening, a pressure release vent member 220, a contact spring 222 which defines an opening, and a gasket 224 which is positioned between these components and the container 204. The collector assembly 206 can optionally include a positive temperature coefficient (PTC) device 226, which defines an opening, disposed between the retainer 218 and the positive contact terminal 216. The positive contact terminal 216 which protrudes above the container 204 is held in place by the inwardly crimped top edge 228 of the container 204 and the gasket 224.

The cathode 212 of the electrode assembly 208 is electrically connected to the collector assembly 206 by contact spring 222. The contact spring 222 can have at least one tab 234 that is biased against the upper edge of the current collector 236 which is disposed at the top of the electrode assembly 208. The current collector 236 is an electrically conductive substrate, for example a metal substrate, on which the cathode materials are disposed, that extends beyond the cathode materials and the separator 214. The current collector 236 may be made from copper, copper alloy, aluminum, aluminum alloy, and other metals as long as they are stable inside the cell and compatible with the materials placed therein. The current collector 236 can be in the form of a thin sheet, a foil, a screen or expanded metal. The contact spring 222 can be made of one or more conductive materials preferably having spring-like characteristics (for example, shape memory alloys or bimetallic materials), although any implement which makes and maintains a sufficient electrical contact with the cell internals will suffice.

When the collector assembly 206 is placed into container 204 during assembly, the current collector 236 can push against the tab 234 of the contact spring 222, which has a composition that is resilient to force. This helps ensure contact between the tab 234 and the current collector 236. The contact spring 222 can have more than one tab 234 for contacting the current collector 236. In some embodiments electrical contact between the tab 234 and the current collector is maintained by the spring-like force applied by the tab 234 against the current collector 236. In other embodiments the tab 234 can be welded to the current collector 236. In yet other embodiments the tab 234 is connected to the current collector 236 with an electrically conductive lead, such as a narrow metal strip or wire welded to both the tab 234 and the current collector 236. Welded connections can sometimes be more reliable, especially under extreme handling, storage and use conditions, but pressure connections do not require additional assembly operations and equipment.

The anode 210 is electrically connected to the inner surface of the container 204 by a metal anode lead (not shown), and the electrode assembly 208 is otherwise physically separated from the container 204 by an outer wrap of the separator 214 and an insulator 238 which is located around the peripheral portion of the top of the electrode assembly 208 to prevent the current collector 236 from making contact with the container 204. Contact between the bottom edge of the cathode 212 and the bottom of the container 204 is prevented by the inward-folded extension of the separator 214 and an electrically insulating bottom disc (not shown) positioned in the bottom of the container 204.

During normal operation of the electrochemical battery cell 200, an electrical device (not shown) can make contact with the positive contact terminal 216 of the collector assembly 206 at one end, and the negative contact terminal at the closed end of container 204. A conductive path is thus established between the negative terminal or container 204, through the anode lead, through the electrode assembly 208, through the current collector 236, and to the collector assembly 206. The current path through the collector assembly 206 is through the tab 234 of the contact spring 222, across the retainer 218, around the pressure release vent member 220, and to the positive contact terminal 216. The retainer 218 can be made of one or more conductive materials, such as metal, bimetal, and tri-layer laminated materials. For example, the retainer 218 can be a metal such as nickel plated steel, nickel plated stainless steel, nickel clad steel, nickel clad stainless steel and/or any combination of steel, stainless steel, copper, aluminum, nickel and alloys thereof.

The positive contact terminal 216 should have good resistance to corrosion by water in the ambient environment as well as good electrical conductivity. Positive contact terminal 216 can be made from a conductive material, such as a nickel plated cold rolled steel, nickel plated cold rolled stainless steel, a steel that is nickel plated after the contact terminals are formed, aluminum, copper and the like. The material used can also depend upon the complexity of the shape of the positive contact terminal 216. If the positive contact terminal 216 has a complex shape, then for example, a type 304 soft annealed stainless steel with ASTM 8 to 9 grain size may be used to provide the desired corrosion resistance in ease of metal forming. Once formed, the positive contact terminal 216 may also be plated or clad with various metals, such as nickel, aluminum, copper, alloys and the like.

The gasket 224 provides a seal for the collector assembly 206 against the top portion of container 204. The gasket 224 can extend from the insulator 238, which physically separates the current collector 236 from the lower portion of container 204 below the bead 207, to the edge 228 of the top portion of container 204. The contour of the top portion of the container 204 includes the bead 207 which provides a seating surface 240 for the collector assembly 206. Gasket 224 physically separates the conductive components of the collector assembly 206 from the top portion of the container 204 and also seals the peripheral edges of the components of the collector assembly 206 to prevent corrosion and leakage of electrolyte between these components. The gasket 224 is sized so that upon inserting the collector assembly 206 into the container 204 and crimping the top edge 228 of the container 204 and gasket 224, the gasket 224 is compressed to create a seal between the gasket 224 and the container 204 as well as between the gasket 224 and interfacial surfaces of the other components of the collector assembly 206.

The gasket 224 can be made of a material composition that can form a compression seal and that also has a low vapor transmission rate (VTR) in order to minimize the entry of water into the cell and the loss of electrolyte from the electrochemical battery cell 200. Gasket 224 can be made of a polymeric composition, for example, a thermoplastic or thermoset polymer, the composition of which is based in part on the chemical compatibility of the anode 210, cathode 212 and electrolyte used in the electrochemical battery cell 200. Examples of materials that can be used in a gasket 224 for a non-aqueous cell, such as a lithium or lithium ion cell, include but are not limited to, polypropylene, polyphenylene sulfide, tetrafluoride-perfluoroalkyl vinyl ether co-polymer, polybutylene terephthalate (PBT), ethylene tetrafluoroethylene, polyphthalamide, and blends thereof. A suitable polypropylene that can be used is PRO-FAX® 6524 from Basell Polyolephins, of Wilmington, Del., USA. A suitable polyphenylene sulfide is available as TECHTRON® PPS from Boedeker Plastics, Inc. of Shiner, Tex., USA. A suitable polyphthalamide is available as Amodel® ET 1001 L from Solvay Advanced Polymers of Alpharetta, Ga. The polymers can also contain reinforcing inorganic fillers and organic compounds in addition to the base resin, such as glass fibers and the like.

A pressure release channel 242 of electrochemical battery cell 200 is defined by the opening of the retainer 218 and the opening of the contact spring 222. The closing of the electrochemical battery cell 200 and the pressure release channel 242 is completed by the pressure release vent member 220 disposed across the openings in the retainer 218 and the contact spring 222. A seal is formed between the peripheral portion of the pressure release vent member 220 and at least one of the retainer 218 and the contact spring 222. This seal can be a result of tight pressure contact at the interfacial surface(s), which can, in some embodiments, be enhanced by compression of the peripheral portion of the pressure release vent member 220. Optionally, an adhesive or sealant can be applied to the interfacial surface(s), as described below. The peripheral portion of at least one of the retainer 218 or the contact spring 222 can also serve to bias the peripheral portion of the pressure release vent member 220 against the sealing interfacial surface(s) as a result of axial forces placed on the gasket 224 and peripheral portions of the other components of the collector assembly 206 when the top edge of the container 204 and gasket 224 are crimped.

During normal operation of electrochemical battery cell 200, gases are generated within the cell through chemical reactions and, in certain instances, generated or increased due to environmental conditions such as temperature. As the internal pressure builds within the electrochemical battery cell 200, the contents are substantially contained within the electrochemical battery cell 200 by the pressure release vent member 220. As the internal pressure builds the pressure release vent member 220 may deform; however, axial compressive force exerted by the container 204 on the collector assembly 206, as described above, can cause the pressure release vent member 220 remain substantially in place to prevent escape of the gases and cell contents through the opening of retainer 218. The compression of the collector assembly 206 within the electrochemical battery cell 200 can at least prevent the pressure release vent member 220 from creeping inwardly so far as to form an opening in the pressure release channel 242 between the opening of retainer 218 and the opening of contact spring 222 when the cell pressure is less than the predetermined release pressure.

However, when the pressure within the electrochemical battery cell 200 is at least as high as a predetermined release pressure, the pressure release vent member 220 ruptures and allows matter, in the form of gas or liquid or both, within the cell to escape through the opening of the retainer 218. The matter within the cell can escape through the one or more vent holes 230 in the positive contact terminal 216. The predetermined release pressure can vary according to the chemical type and the integrity of the electrochemical battery cell 200 in view of safety and environmental requirements, with the preferred lower limit being a pressure which will avoid false vents due to normal handling or extremes in the ambient environment and the preferred upper limit selected as to avoid disassembly of the cell based on the container materials and the closing forces applied to the header assembly. For example, in an AA size lithium battery, the predetermined release pressure, i.e. the pressure at which the pressure release vent member 220 creates an opening, for example, via rupturing, can range from about 10.5 kg/cm$^2$ (150 lbs/in$^2$) to about 112.6 kg/cm$^2$ (1600 lbs/in$^2$) and in some embodiments, from about 14.1 kg/cm$^2$ (200 lbs/in$^2$) to about 56.3 kg/cm$^2$ (800 lbs/in$^2$) at room temperature. The pressure at which the pressure release vent member ruptures can be determined by pressurizing a cell, e.g., through a hole punctured in the container.

As mentioned above, the electrochemical battery cell 200 can optionally include a PTC device 226 which defines an opening and is disposed between the retainer 218 and the positive contact terminal 216. During normal operation of the electrochemical battery cell 200, current flows through the PTC device 226. If the temperature of the electrochemical battery cell 200 reaches an abnormally high level, the electrical resistance of the PTC device 226 increases to reduces the current flow. The PTC device 226 can slow or prevent cell continued internal heating and pressure buildup resulting from electrical abuses such as external short circuiting, abnormal charging and forced deep discharging. However, if internal pressure continues to build to the predetermined release pressure, the pressure release vent member 220 ruptures to relieve the internal pressure.

The pressure release vent member 220 disposed between the retainer 218 and the contact spring 222, includes at least one layer of a composition of metal, polymer, or mixtures thereof. It is also possible that the pressure release vent member 220 can include two or more layers of different material compositions. For example, a second layer having a different composition than a first layer may be used for purposes of bonding the pressure release vent member 220 to the retainer 218 or to the contact spring 222. In another example, a second and a third layer having a different composition than the first layer, may be used to bond the pressure release vent member 220 to both the retainer 218 and the contact spring 222. Also, multiple layers having two or more compositions can be used for tailoring the performance properties, for example, strength and flexibility, of the pressure release vent member 220. Ideally, separate layers would be provided on the basis of compatibility with the electrolyte, ability to prevent vapor transmission and/or ability to improve the sealing characteristics of the vent member 220 within the collector assembly 206. For example, an adhesive activated by pressure, ultrasonic and/or heat, such as a polymer or any other known material in the adhesive field that is compatible with the elements disclosed herein, could be provided as a layer of the vent member 220 in order to bond the vent member 220 within the collector assembly 206.

Compositions suitable for use in the pressure release vent member 220 can include, but are not limited to, metals such as aluminum, copper, nickel, stainless steel, and alloys thereof; and polymeric materials such as polyethylene, polypropylene, polybutylene terephthalate (PBT), polyethylene terephthalate (PET), ethylene acrylic acid, ethylene methacrylic acid, polyethylene methacrylic acid, and mixtures thereof. The composition of the pressure release vent member 220 can also include polymers reinforced with metal, as well as a single layer or a multi-layer laminate of metals or polymers or both. For example, the single layer can be a metal foil, preferably aluminum foil, that is substantially impermeable to water, carbon dioxide and electrolyte, or a non-metallized film of a polymer coated with a layer of oxidized material that prevents vapor transmission, such as, for example, $SiO_x$ or $Al_2O_x$. The pressure release vent member 220 can furthermore contain an adhesive layer that contains a contact-bonding adhesive material, for example polyurethane, or a heat, pressure and/or ultrasonically activated material, for example low density polyolefins. Alternatively, these or other adhesives or sealant materials can be separately applied to a portion of the pressure release vent member (e.g., the outer periphery coming into contact with retainer 218 and/or spring 222), the retainer 218, the spring 222 or any combination thereof for enhancing the seal within the collector assembly. A preferred laminar vent construction would have four layers consisting of oriented polypropylene, polyethylene, aluminum foil and low density polyethylene.

Regardless of the composition, the pressure release vent member 220 should be chemically resistant to the electrolyte contained in the cell 200 and should have a low vapor transmission rate (VTR) to provide a low rate of weight loss for the cell 200 over a broad range of ambient temperatures. For example, if the pressure release vent member 220 is metal which is impervious to vapor transmission, the VTR through the thickness of the pressure release member 220 is substantially zero. However, the pressure release vent member 220 can include at least one layer of vapor-permeable material, for example polymeric materials, as described above, that can function, for example, as an adhesive or as an elastomeric layer to achieve a seal between the pressure release vent member 220 and at least one of the retainer 218 and the contact spring 222.

The VTR measured at 75° C. of a layer of the pressure release vent member 220 according to example embodiments of the present invention can be less than about 11.81 g·mm/(day·mm$^2$) {3000 g·mil/(day·in$^2$)}, and in some embodiments can range from about 0.1969 g·mm/(day·mm$^2$) {50 g·mil/(day·in$^2$)} to about 0.1181 g·mm/(day·mm$^2$) {3000 g·mil/(day·in$^2$)}, and in some embodiments can range from about 0.001969 g·mm/(day·mm$^2$) {50 g mil/(day·in$^2$)} to about 0.1181 g·mm/(day·mm$^2$) {3000 g·mil/(day·in$^2$)}, in alternative embodiments, from about 0.003543 g·mm/(day·mm$^2$) {90 g·mil/(day·in$^2$)} to about 0.0984 g·mm/(day·mm$^2$) {2500 g·mil/(day·in$^2$)}, and in yet alternative embodiments, from about 0.003543 g·mm/(day·mm$^2$) {90 g mil/(day·in$^2$)} to about 0.059 g·mm/(day·mm$^2$) {1500 g·mil/(day·in$^2$)}. The VTR can vary according to the composition of the electrolyte contained in the electrochemical battery cell 200, in addition to the composition of a vapor-permeable layer of the pressure release vent member 220 which can be chosen such that the VTR is within the desired limits. While data is provided for VTR measurements at 75° C., it should be understood that VTR is temperature dependent so that other VTR values are possible without departing from the principles of this invention. Pressure release vent members having more than one layer of material and the test procedure for calculating the VTR are described in more detail below.

The predetermined release pressure, or the pressure at which the pressure release vent member 220 is intended to rupture, is a function of its physical properties (e.g., strength), its physical dimensions (e.g., thickness) and the area of the opening defined by the retainer 218 and the opening defined by the PTC device 226, whichever is smaller. The greater the exposed area of the pressure release vent member 220 by the retainer 218 and the PTC device 226, the lower will be the predetermined release pressure due to the greater collective force exerted by the internal gases of the electrochemical battery cell 200. Consequently, adjustments may be made to any of these variables in order to engineer a collector assembly and vent member without departing from the principles of this invention.

Depending upon the exposed area of the vent member 220 relative to the opening defined by retainer 218, the thickness of the pressure release vent member 220 can be less than about 0.254 mm (0.010 inch), and in some embodiments can range from about 0.0254 mm (0.001 inch) to about 0.127 mm (0.005 inch), and in yet other embodiments the thickness can range from about 0.0254 mm (0.001 inch) to about 0.05 mm (0.002 inch). The composition and thickness of the pressure release vent member 220 can be determined by those of ordinary skill in the art, in view of the vapor transmission rate (VTR) and predetermined release pressure requirements.

The pressure release vent member can include at least one layer of a composition containing metal, polymer, and mixtures thereof. A suitable three-layer laminate that can be used for the pressure release vent member is PET/aluminum/EAA copolymer available as LIQUIFLEX® Grade 05396 35C-501C from Curwood of Oshkosh, Wis., USA. A suitable four layer material of oriented PP/PE/aluminum/LDPE is FR-2175 from Ludlow Coated Products of Columbus, Ga., USA, which is a wholly-owned subsidiary Tyco International, Ltd. of Princeton, N.J., USA. A suitable five-layer laminate is PET/PE/Aluminum/PE/LLDPE available as BF-48 also from Ludlow Coated Products of Columbus, Ga., USA. However, as noted above, any combination of laminates for polypropylene, polyethylene, non-metallized polymeric films coated with a layer of oxidized material that prevents vapor transmission (for example, $SiO_x$ or $Al_2O_x$) and/or aluminum-based foils are also specifically contemplated.

The VTR ranges of any permeable layer of the pressure release vent member 220 (FIG. 1), 320 (FIG. 3), and 420 (FIG. 4) as described above can be determined using a method adapted from ASTM E96-80 (Standard Test Method for Water Vapor Transmission of Materials). A test membrane 501 (FIG. 5) having a composition of a permeable layer of the pressure release vent member, for example pressure release vent members 220, 320, 420, is placed over the top of a 15 ml bottle (e.g., Wheaton Serum Bottle, 25 mm diameter×54 mm high, Cat. No. 06-406D) that is 25 mm diameter by 54 mm high and contains 8 ml of the electrolyte to be used in a cell. The vent membrane 501 has a wall 503, a hub 505 and a test surface 507 sized to provide a seal against the bottle. The outer diameter of wall 503 is 19.56 mm and the inner diameter of wall 503 is 14.33. The hub 505 has a diameter of 3.23 mm and a length below the test surface 507 of 1.91 mm. The test surface 507 has a thickness of 0.508 mm and a test surface area, which is the annular area between wall 503 and hub 505, of 1.529 cm². Vacuum grease is applied to the lip of the bottle, and a seal (e.g., Wheaton Aluminum Seal Cat. No. 060405-15) having a 15.88 mm diameter center hole is placed over the test membrane and crimped tightly onto the bottle such that the test membrane 501 will remain sealed to the bottle during the test. The sealed bottle is weighed and the bottle is stored at 75° C. and weighed at regular intervals within a predetermined test period (e.g. monthly for six months, daily for two weeks, etc.). The change in weight is determined over the test period and the first experimental VTR is calculated.

The same test is performed on a sealed empty bottle as described above and the change in weight is determined over the same regular intervals and test period, and the second experimental VTR is calculated. Each of the first and second experimental VTR is calculated using the average total weight loss. Finally, the second experimental VTR calculated for the test run on the empty bottle is subtracted from the first experimental VTR calculated for the test run on the bottle containing electrolyte to obtain the VTR of the test membrane.

Notably, the VTR may be calculated at any temperature according to the method above. Preferably, the selected temperature will optimize the accuracy and reliability of the VTR calculation without significantly biasing or negatively impacting the materials utilized in the cell and/or in the test method.

The electrochemical battery cells 200 can be assembled by any suitable process. For example, the electrochemical battery cell 200 of FIG. 2 can be made by inserting the electrode assembly 208 and the insulator 238 into the cell container 204 and then dispensing electrolyte into the container 204. The gasket 224, the contact spring 222, the retainer 218, the pressure release vent member 220, and, optionally, the PTC device 226 are then placed in the open end of the container 204. The container 204 is supported at the bead 207 while the collector assembly 206 including gasket 224 and positive contact terminal 216 are pushed downward against the seating portion 240 of the bead 207 and the crimped top edge 228 of the container 204 is bent inward so that the crimped top edge of container 204 is mechanically compressed against gasket 224 to complete the sealing of the open end of the housing. Any suitable method may be used to seal the electrochemical battery cell 200, such as deforming the container 204 by crimping, swaging, or redrawing via a collet or other appropriate tooling. As explained in greater detail below, the unique shape of vent member 220 allows for exceptional mechanical strength in both the radial and axial directions.

In an alternative embodiment, the pressure release vent member 220 can be bonded to the retainer 218 by one or more several methods, such as by hot melting, ultrasonic welding, by the application of an adhesive or by any combination of these methods. As described above, the pressure release vent member 220 can be a single layer, or alternatively, a laminate of two or more layers of materials. In such case, the pressure release vent member 220 can be bonded to the retainer 218 to form a subassembly that is then inserted into the container 204 following the gasket 224 and the contact spring 222. The PTC device 226 and the positive contact terminal 216 are then placed in the open end of the container 204 to seal the electrochemical battery cell 200. Alternatively, the pressure release vent 220 can be bonded to both the contact spring 222 and the retainer 218 by one of the methods described above.

The example embodiment of electrochemical battery cell 300 (FIG. 3) includes a crimped retainer 318 that is formed by placing the pressure release vent member 320 onto the retainer 318, placing the contact spring 322 onto the pressure release vent member 320, and then bending the edge 319 of the retainer 318 so that it contacts the folded edge 332 of contact spring 310 to form a subassembly. Given the protrusions (discussed below) on the vent member 220, the vent member 220 is mechanically compressed both axially and radially between retainer 318 and spring 322. The pressure release vent member 320 can be optionally bonded to the retainer 318 or to the contact spring 322 or both the retainer and the contact spring.

Figure 3:
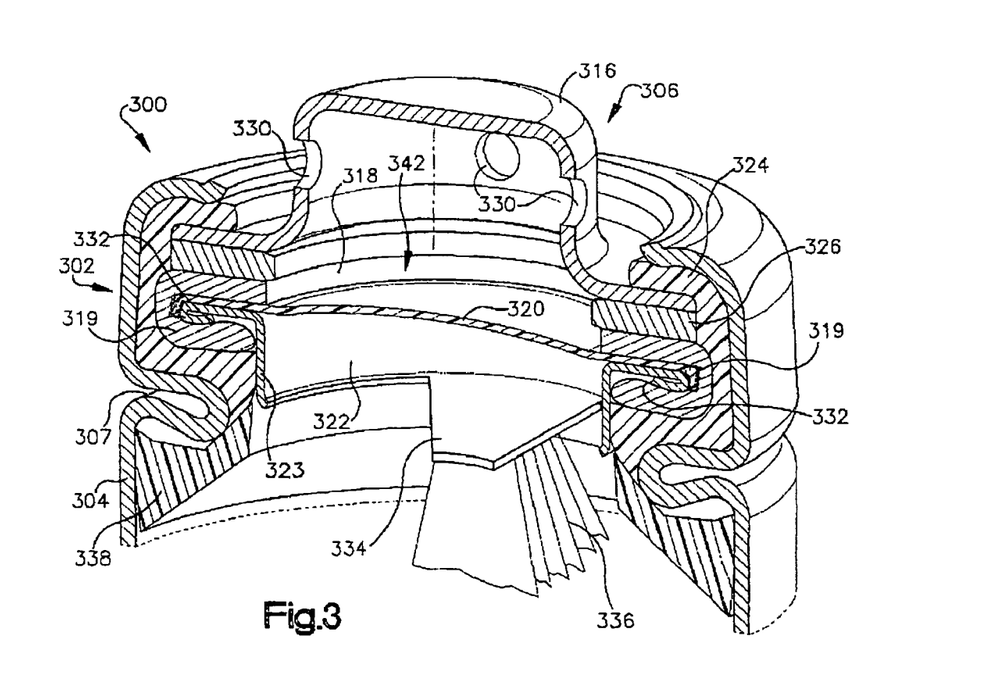
FIG. 3 is a cross-sectional view of the header assembly according to another embodiment of the invention.
Figure 4:
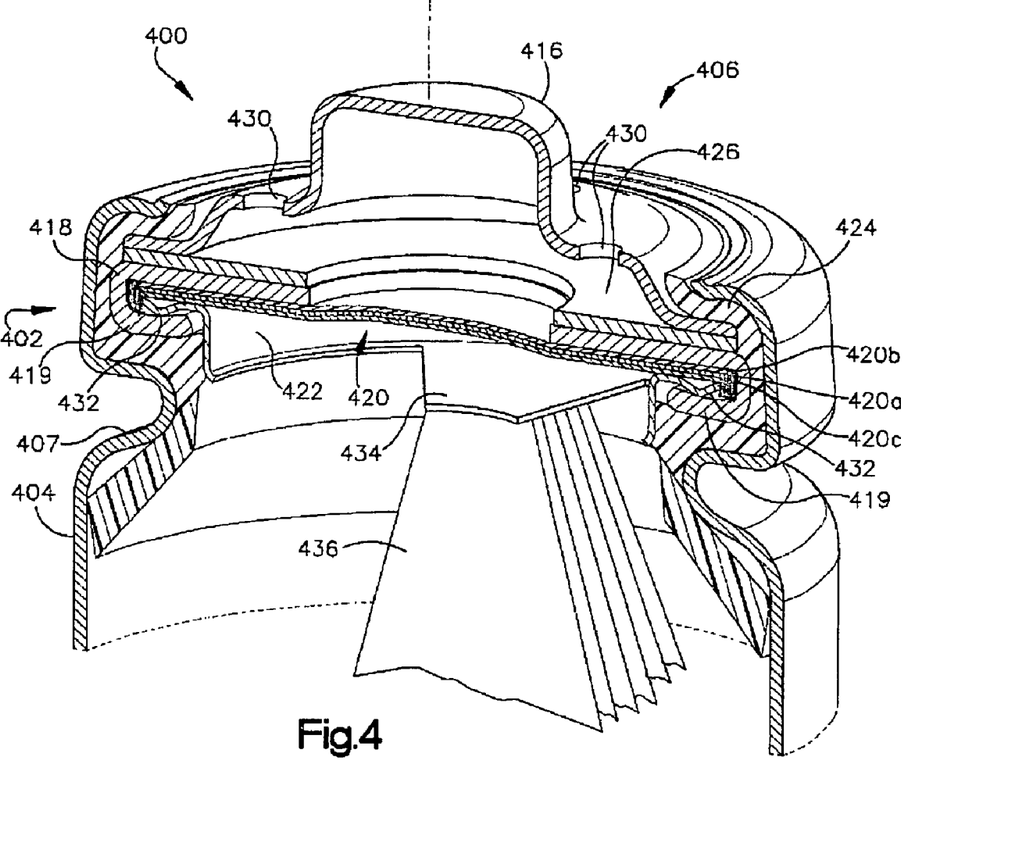
FIG. 4 is a cross-sectional view of a the header assembly according to a third embodiment of the invention.
Figure 5:
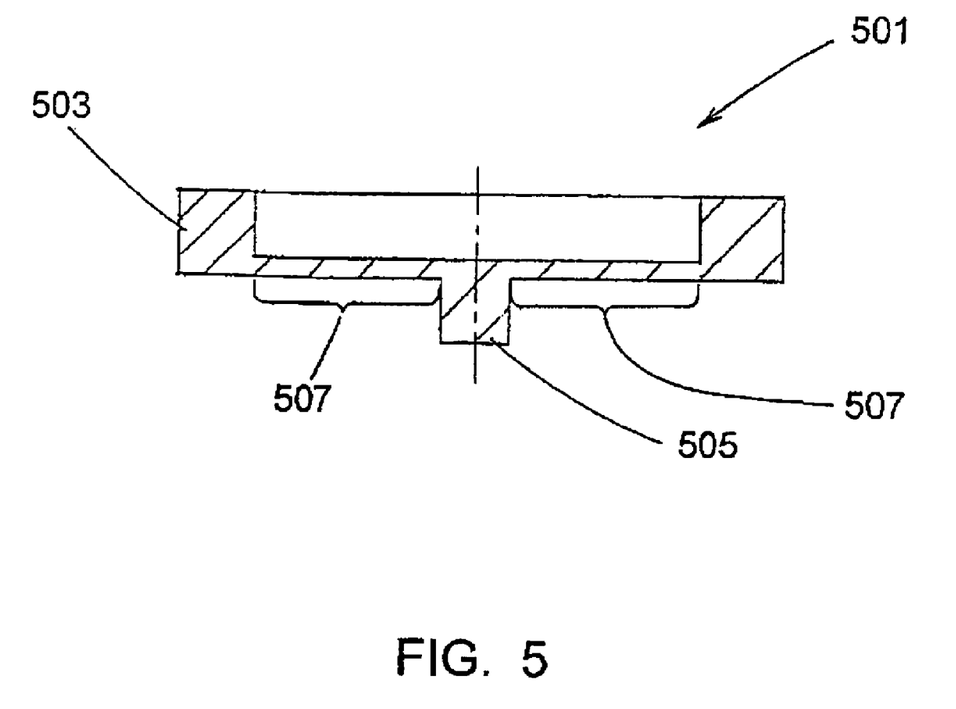
FIG. 5 is a cross-sectional view of a test membrane used in the Vapor Transmission Rate (VTR) test.

A similar subassembly can be formed for use in electrochemical battery cell 400 (FIG. 4). Where the contact springs 322 and 422 include folded edges 332 and 432, respectively, the peripheral flanges of the contact springs 322 and 422 are shaped to form one of many possible geometries, such as an annulus or polygon, with one of many possible profiles, such as a V-groove or folded edge, before the contact springs are used to form the subassemblies. Notably, throughout FIGS. 2-4, care has been taken to utilize the last two digits of the reference numerals so as to have these figures correspond to one another (whereas the first digit of the reference numerals for FIGS. 2-4 corresponds to the figure number itself).

The vent member 220 must provide a complete vapor barrier across vapor release channel 242. To the extent that vent will be mechanically compressed, it is important that the vent member 220 be sized so that it blocks channel 242 and allows enough excess surface to allow for good sealing with the parts comprising the collector assembly 206. However, the vent member 220 must not become wrinkled or folded, as such wrinkles or folds can allow for unwanted leakage of electrolyte out of the cell.

Thus, the vent member must be shaped accordingly. In one embodiment particularly suited for cylindrical cells shown in FIG. 6, the vent member 620 has an essentially round or disc-shaped body 660 with a series of protrusions 662 formed along the circumferential periphery of the body 660. Notably, circular body 660 is sized to correspond with the size of the pressure relief channel, as indicated by broken line 664. Alternative designs for vent member 620 are possible, so long as the body shape and broken line 664 correspond to the shape of the open end of the can, while the overall profile of the vent member 620 created by the protrusions 662 has a different shape relative to broken line 664 (keeping in mind that the term shape refers to a substantially differing geometric shape). Protrusions that minimize wasted raw materials during the mass production of vent member 220, such as protrusions which create an essentially square or a hexagonal shape for shaped vent member 220, may be particularly useful.

During assembly of the cell, protrusions 662 will be at least partially folded back and compressively held between the gasket and the collector assembly. More specifically, the protrusions 662 can be crimped or otherwise compressed between: the spring 122 and the retainer 118 (as shown in FIG. 2); the spring peripheral folded edge 332 and the retainer 318 (as shown in FIG. 3) and the spring peripheral folded edge 432 and the retainer 418 (as shown in FIG. 4). In each instance, the crimp is accomplished without creating wrinkles or folds in the vent member 620. Preferably, the crimp will result in the vent member making contact with the spring in at least two distinct spatial planes and preferably in planes that are parallel to the radial and axial dimensions of the container, although other configurations are possible.

Retainer 218, 318, 418 can be shaped as an inner header ring sized to fit inside of an outer header ring or the open end of cell 200, 300, 400. Alternatively, retainer 218, 318, 418 can be shaped like a closure cup, with an aperture formed in the bottom so as to allow gas to flow therethrough. In either instance, the retainer cooperates with the vent member and the spring to form a cell closure which is then fitted into the open end of the cell container. A gasket fitted concentrically inside the retainer on either or both sides of the spring may also be used to further enhance the compressive forces mechanically sealing the vent member within the collector assembly.

Figure 6:
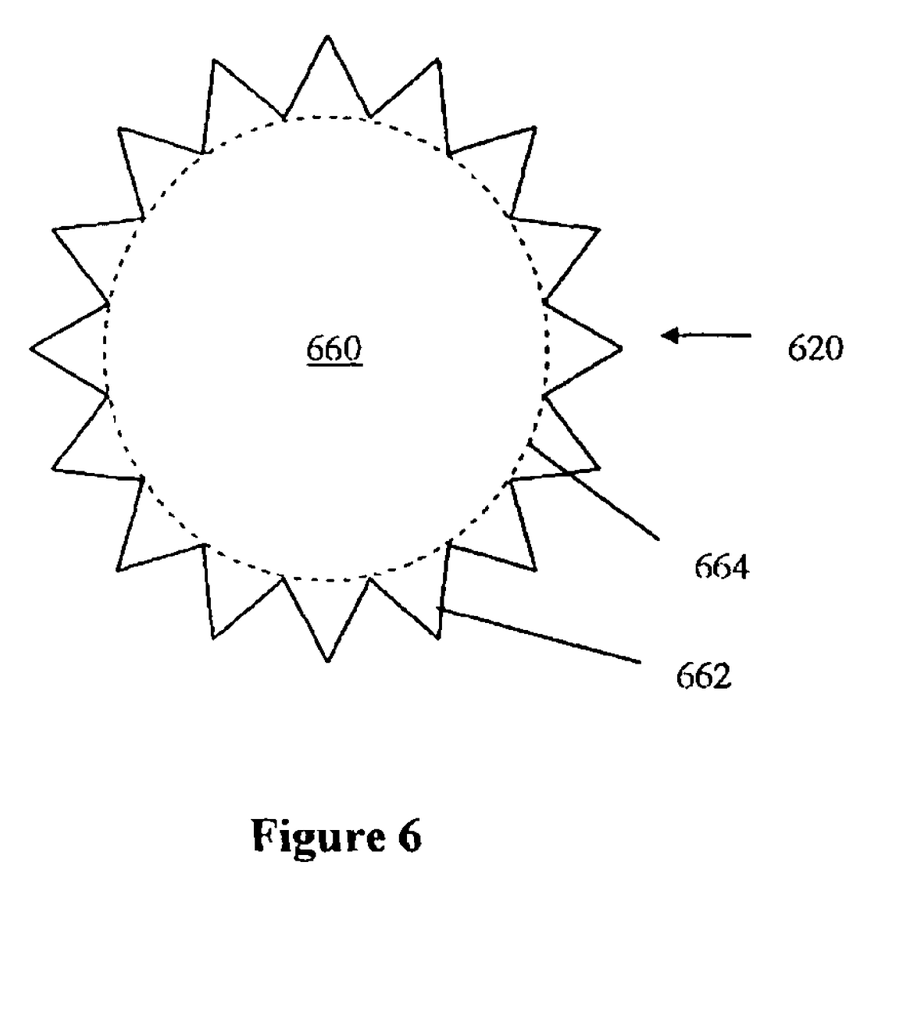
FIG. 6 is a top view of the vent member according to one embodiment of the invention.

Protrusions 662 on vent member 620 have a defined peripheral shape along their outermost edge. This shape may be the same for each individual protrusion (as shown in FIG. 6), or the protrusions may have differing shapes. Suitable shapes include but are not limited to the triangular or saw-tooth configuration as shown in FIG. 6, a concave parabola, a convex parabola or a multi-sided polygon (e.g., square, pentagonal, etc.). Notably, the shape of the protrusions may impart a non-circular radial profile to vent member 620. Any of shape or combination of shapes is acceptable so long as the vent member 620 does not become wrinkled during the assembly process.

The radial length of the protrusions may be sized according to the corresponding length of the axial sidewalls of the closure cup or inner header ring. Ideally, the closure cup/header ring will have a sidewall with an axial height, whereas the protrusion 662 will extend radially beyond broken line 664 for a distance that is most preferably one half the axial height of this sidewall. As used herein, the term "radial" refers to the primary spatial plane (i.e., the width) of vent member 620, whereas "axial" refers to the spatial plane parallel to the thickness of vent member 620.

Other configurations for the protrusions of the vent member are possible. As noted above, a key feature of the vent is its ability to avoid wrinkles or folds during the closure process. Essentially, this means that the protrusions are spaced along the periphery of the vent member so that none of the protrusions overlap or come into physical contact when the protrusions are at least partially folded back towards a common center point on the vent.

The collector assembly 206 shown in FIG. 2 consumes less vertical height, or shoulder height, than the collector assembly 106 of the prior art of FIG. 1, thereby allowing for greater volume in the top portion of the container 204 in electrochemical battery cell 200 to accommodate active electrode materials. The pressure release vent member 220 (FIG. 2), being substantially flat, consumes less vertical space than the cell cover 144 having vent well 150 (FIG. 1). As a result, the top portion of a conventional AA size lithium/FeS$_2$ electrochemical battery cell 100 has a shoulder height h2 of about 3.175 mm (0.125 inch), whereas the top portion of AA size lithium/FeS$_2$ electrochemical 200 in an example embodiment of the present invention can have a shoulder height h1 of about 2.667 mm (0.105 inch) or less. Such a decrease in header assembly height allows for more electrochemically active material to be inserted in the cell, thereby improving service life. In addition, the collector assembly 206 (FIG. 2) has fewer parts than the collector assembly 106 (FIG. 1) of the prior art, which allows for greater ease and flexibility in assembly and manufacturing, thereby reducing costs.

As used throughout this specification, it should be understood that the combination of the retainer and spring is referred to interchangeably as a collector assembly or a header assembly. Furthermore, certain embodiments of the invention may not necessarily require integration or use of an actual spring or electrical contact, so that a simple interior retainer ring or some other integral part (e.g., the PTC) may be used in formation of the header assembly without departing from the principles of this invention; accordingly, this element may be referred to generically as a contact mechanism.

Materials that can be used for the electrode assembly and the electrolyte in the embodiments of the present invention, including but not limited to the example embodiments described above, include any of the following:

The anode in a lithium electrochemical battery cell contains lithium metal, often in the form of a sheet or foil. The composition of the lithium can vary, though the purity is always high. The lithium could be alloyed with other metals such as aluminum, to provide the desired cell electrical performance. The anode for a lithium ion cell includes one or more lithium-intercalable materials. By intercalable materials it is meant that the material is capable of insertion and de-insertion of lithium ions into their crystalline structure. Examples of suitable materials include, but are not limited to, carbons such as graphitic, mesophase and/or amorphic carbons; transition metal oxides such as nickel, cobalt and manganese; transition metal sulfides, for example, those of iron, molybdenum, copper and titanium; and amorphous metal oxide, for example those containing silicone and tin. These materials are generally particulate materials that are formed into the desired shape.

A cathode for a lithium cell contains one or more active materials, usually in particulate form. Any suitable active cathode material may be used, and can include for example FeS$_2$, MnO$_2$, CF$_x$ and (CF)$_n$. A cathode for a lithium ion cell contains one or more lithium-intercalated or lithium-intercalable materials, usually in particulate form. Examples include metal oxides, such as vanadium and tungsten; lithiated transition metal oxides, for example, nickel, cobalt and manganese; lithiated metal sulfides for example those of iron, molybdenum, copper and titanium; and lithiated carbons. Notably, the choice of cathode material will have direct impact on the optimal electrolyte, both in terms of chemical compatibility and overall cell performance, such that the header assembly must be specifically engineered to the materials selected.

Suitable separator materials are ion-permeable and electrically non-conductive. Examples of suitable separators include microporous membranes made from materials such as polypropylene, polyethylene and ultra high molecular weight polyethylene. A suitable separator material for Li/FeS$_2$ cells is available as CELGARD® 2400 microporous polypropylene membrane from Celgard Inc., of Charlotte, N.C., USA, and Setella F20DHI microporous polyethylene membrane available from Exxon Mobil Chemical Company of Macedonia, N.Y., USA. A layer of a solid electrolyte or a polymer electrolyte can also be used as a separator.

Electrolytes for lithium and lithium ion cells are non-aqueous electrolytes and contain water only in very small quantities, for example, less than about 500 parts per million by weight, as a contaminant. Suitable non-aqueous electrolytes contain one or more electrolyte salts dissolved in an organic solvent. Any suitable salt may be used depending on the anode and cathode active materials and the desired cell performance. Examples include lithium bromide, lithium perchlorate, lithium hexafluorophosphate, potassium hexafluorophosphate, lithium hexafluoroarsonate, lithium trifluoromethanesulfonate and lithium iodide. Suitable organic solvents include one or more of the following: dimethyl carbonate; diethyl carbonate; dipropyl carbonate; methylethyl carbonate; ethylene carbonate; propylene carbonate; 1,2-butylene carbonate; 2,3-butylene carbonate; methaformate; gamma-butyrolactone; sulfolane; acetonitrile; 3,5-dimethylisoxazole; n,n-dimethylformamide; and ethers. The salt and solvent combination should provide sufficient electrolytic and electrical conductivity to meet the cell discharge requirements over the desired temperature range. When ethers are used in the solvent they provide generally low viscosity, good wetting capability, good low temperature discharge performance and high rate discharge performance. Suitable ethers include, but are not limited to, acyclic ethers such as 1,2-dimethoxyethane (DME); 1,2-diethoxyethane; di(methoxyethyl)ether; triglyme, tetraglyme and diethylether; cyclic ethers such as 1,3-dioxolane (DIOX), tetrahydrofuran, 2-methyl tetrahydrofuran and 3-methyl-2-oxazolidinone; and mixtures thereof.

Although this invention is best suited to non-aqueous cells, other electrochemical battery cells other than lithium and lithium ion cells may be applicable. Examples include both primary and rechargeable cells with aqueous electrolytes, such as zinc/$MnO_2$, zinc/NiOOH, nickel/cadmium and nickel/metal hydride alkaline cells. These types of cells can have alkaline electrolytes with solutes such as potassium hydroxide, sodium hydroxide and mixtures thereof. The preferred materials for the collector assembly in such cases should still be optimized to insure adequate chemical compatibility and to minimize costs in terms of raw materials. For example, use of nylon gaskets (in place of the materials mentioned above) would yield sufficient performance in combination with aqueous electrolytes. Other potential substitutions will be apparent to those skilled in the art.

Although the foregoing invention has been described in some detail for purposes of clarity of understanding, it will be apparent that certain changes and modifications may be practiced within the scope of the appended claims. For example, although the specification has described primarily lithium and lithium ion cells, the invention can also apply to other cell types. Also, while the embodiments described above have illustrated a pressure release vent member associated with a positive contact terminal that is connected to a cathode on discharge, the same release mechanism could be employed at a negative cell terminal. Therefore, the present embodiments are to be considered as illustrative and not restrictive, and the invention is not to be limited to the details given herein, but may be modified, and is limited only by the scope of the appended claims.

What is claimed is:

1. A vent closure seal assembly for an electrochemical cell container, said assembly comprising: a closure cup having an aperture to allow electrochemical reaction gas to flow therethrough;

a contact member having a defined peripheral shape;

a rupturable vent fixed between the closure cup and the contact member to selectively control the flow electrochemical reaction gas through the assembly, said rupturable vent having a peripheral shape that, is not the same as the defined peripheral shape of the contact member;

wherein a first diameter of the rupturable vent is equal to a corresponding first diameter of the defined peripheral shape of the contact member along a first common planar axis;

wherein a second diameter of the rupturable vent is greater than a corresponding second diameter of the defined peripheral shape of the contact member along a second common planar axis;

wherein the first and second common planar axes intersect at a center point of said contact member; and wherein the vent is not rectangular in shape and a plurality of planar protrusions are integrated along a peripheral edge of the rupturable vent.

2. An assembly according to claim 1 wherein the planar protrusions have substantially the same size and shape, the closure cup includes a sidewall with a defined length and the planar protrusions extend radially beyond non-protruding portions of the rupturable vent for a distance of no more than one-half of the defined length of the sidewall.

3. An assembly according to claim 1 wherein the rupturable vent is held within the closure cup by mechanical compression.

4. An assembly according to claim 3 wherein the mechanical compression comprises a peripheral crimp causing the rupturable vent to create a sealed contact with the contact member in at least two separate spatial planes.

5. An assembly according to claim 1 wherein the rupturable vent is adhesively held within the closure cup.

6. An assembly according to claim 5 wherein the rupturable vent is also held within the closure cup by mechanical compression.

7. An assembly according to claim 6 wherein the mechanical compression comprises a peripheral crimp causing the rupturable vent to create a sealed contact with the contact member in at least two spatial planes.

8. An assembly according to claim 1 wherein the rupturable vent is a laminate including a metal foil, an adhesive and polymeric material.

9. An assembly according to claim 8 wherein the layers are arranged so that the polymeric material is proximate to the contact member and the metal foil is disposed between the polymeric material and the adhesive.

10. An assembly according to claim 1 wherein the rupturable vent comprises aluminum.

11. An assembly according to claim 1 wherein the rupturable vent comprises an adhesive.

12. An assembly according to claim 1 wherein the rupturable vent comprises a polymer.

13. An assembly according to claim 1 further comprising a gasket positioned proximate to the contact member.

* * * * *